UNITED STATES PATENT OFFICE.

SAMUEL TRUSCOTT, OF CLEVELAND, OHIO.

IMPROVEMENT IN RUBBER PAINT.

Specification forming part of Letters Patent No. 113,368, dated April 4, 1871.

I, SAMUEL TRUSCOTT, of Cleveland, in the county of Cuyahoga and State of Ohio, have invented a certain Compound called Rubber Paint, to be used for painting the outside or inside of houses or any other structure, and for general purposes.

The nature of this invention consists in mixing the following-named ingredients in the proportions and manner as below stated, viz: India-rubber, resin, bees-wax, zinc or other pigment, quicklime, linseed-oil, benzine, and water.

To make fifty gallons of paint, take six (6) pounds india-rubber; three (3) pounds resin; two (2) pounds bees-wax, with two (2) gallons linseed-oil. Put them in a suitable kettle or caldron placed over a moderate fire, and when sufficiently melted put the mixture into a suitable vat provided for the purpose; and then add one (1) pound quicklime; eighteen (18) gallons linseed-oil; ten (10) gallons benzine; ten (10) gallons water; and two hundred (200) pounds of zinc or other pigment, and then stir or agitate the whole until it is thoroughly mixed, when it will be ready for use.

This makes a very durable and economical white paint, which will make a good and glossy coat when dry, and one that retains a fresh appearance for a very long time, and is not affected by the weather.

To make the different colors, shades, and tints, a sufficient amount of the colored pigments may be added to this paint to give the desired shade or tint.

I claim as my invention—

The manufacture or preparation of a compound called rubber paint, of the ingredients, in the proportions and for the purpose set forth.

S. TRUSCOTT.

Witnesses:
 GEO. W. TIBBITTS,
 GEO. A. KOLBE.